US012590677B2

(12) United States Patent
Muehleder

(10) Patent No.: US 12,590,677 B2
(45) Date of Patent: Mar. 31, 2026

(54) METHOD FOR ACTUATING A TANK DEVICE, AND TANK DEVICE FOR STORING A GASEOUS MEDIUM

(71) Applicant: Robert Bosch GmbH, Stuttgart (DE)

(72) Inventor: Friedrich Muehleder, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 18/574,832

(22) PCT Filed: May 31, 2022

(86) PCT No.: PCT/EP2022/064706
§ 371 (c)(1),
(2) Date: Dec. 28, 2023

(87) PCT Pub. No.: WO2023/280471
PCT Pub. Date: Jan. 12, 2023

(65) Prior Publication Data

US 2024/0302002 A1 Sep. 12, 2024

(30) Foreign Application Priority Data

Jul. 8, 2021 (DE) ..................... 10 2021 207 190.2

(51) Int. Cl.
*F17C 13/04* (2006.01)
*F17C 13/08* (2006.01)

(52) U.S. Cl.
CPC ............ *F17C 13/04* (2013.01); *F17C 13/084* (2013.01); *F17C 2201/0104* (2013.01);
(Continued)

(58) Field of Classification Search
CPC .................... F17C 13/04; F17C 13/084; F17C 2201/0104; F17C 2201/035;
(Continued)

(56) References Cited

U.S. PATENT DOCUMENTS 12,209,708 B2 * 1/2025 Kuntz ..................... F17C 5/007
2006/0246177 A1 * 11/2006 Miki ....................... F17C 5/007
426/24

FOREIGN PATENT DOCUMENTS

DE 102009024794 A1 12/2010
DE 102014000713 A1 7/2015
(Continued)

OTHER PUBLICATIONS

Translation of International Search Report for Application No. PCT/EP2022/064706 dated Aug. 30, 2022 (2 pages).

*Primary Examiner* — David J Walczak
(74) *Attorney, Agent, or Firm* — Michael Best & Friedrich LLP

(57) ABSTRACT

Method for actuating a tank device (1) for storing a gaseous medium, comprising at least two tank containers (2) and a feed line (3) which can be connected to the tank containers (2). Each tank container (2) has at least one pressure-controlled control valve (5), via which gaseous medium flows from the tank device (1) into the feed line (3) in the direction of a load system (40). The invention is characterized by the following step:

a. simultaneously opening the control valves (5) of the tank container (2) in a span of milliseconds while supplying the load system (40) such that a gaseous medium is conducted from the tank device (1) in the direction of the load system (40) via the feed line (3).

14 Claims, 1 Drawing Sheet

(52) U.S. Cl.
CPC .................. *F17C 2201/035* (2013.01); *F17C 2205/0142* (2013.01); *F17C 2205/0326* (2013.01); *F17C 2205/0332* (2013.01); *F17C 2221/012* (2013.01)

(58) Field of Classification Search
CPC ...... F17C 2205/0142; F17C 2205/0326; F17C 5/007; F17C 2201/012; F17C 2223/0123; F17C 2250/043
USPC .......................................................... 222/3, 6
See application file for complete search history.

(56) References Cited

FOREIGN PATENT DOCUMENTS

| | | | |
|---|---|---|---|
| DE | 102017212485 | A1 | 1/2019 |
| DE | 102018209057 | A1 | 12/2019 |
| WO | 2021170344 | A1 | 9/2021 |

* cited by examiner

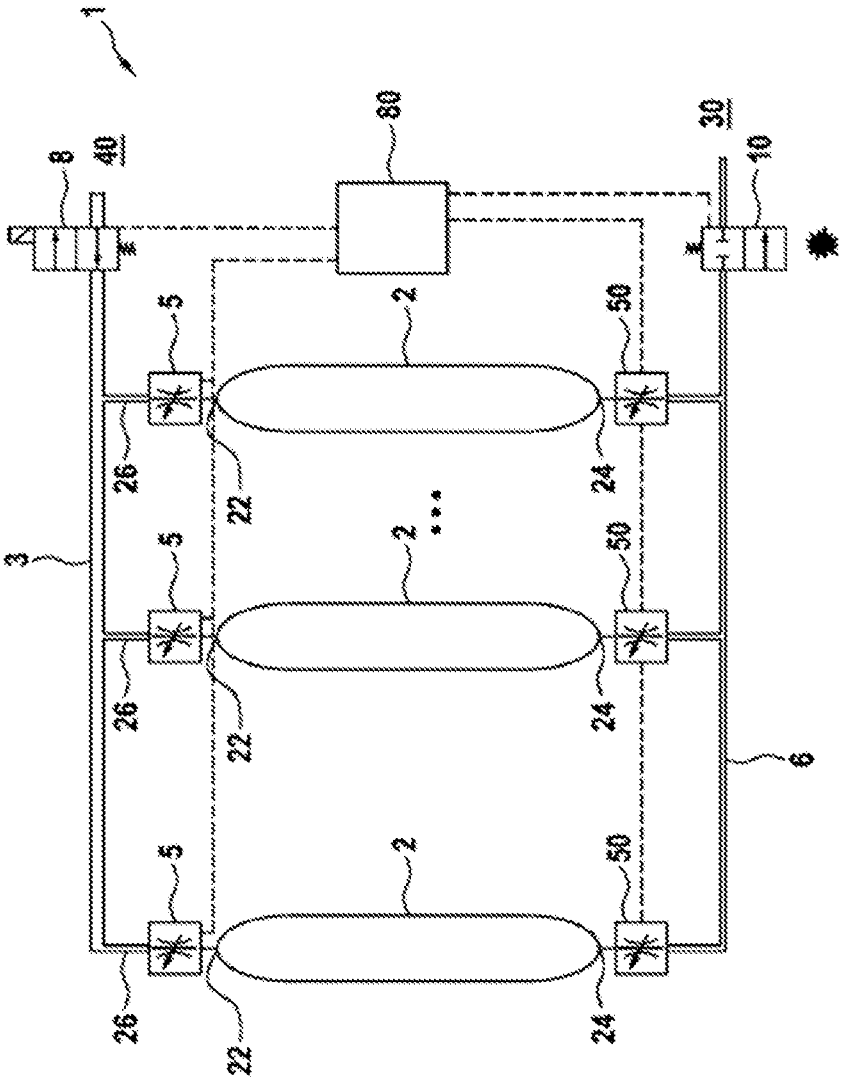
1
80
30
40
8
10
2
2
2
5
5
5
50
50
50
3
6
26
26
26
22
22
22
24
24
24

METHOD FOR ACTUATING A TANK DEVICE, AND TANK DEVICE FOR STORING A GASEOUS MEDIUM

BACKGROUND

The invention relates to a method for actuating a tank device and a tank device for storing a gaseous medium, in particular hydrogen, for use, for example, in vehicles with a fuel cell drive or in vehicles with a hydrogen burner as the drive.

DE 10 2017 212 485 A1 describes a device for storing compressed fluids that serve as fuel for a vehicle, the device comprising at least two tubular tank modules and at least one high-pressure fuel distributor having at least one integrated control and safety system.

A large number of valves are required for the safety precautions of such a facility, which increases the complexity of the entire gas storage system and its costs.

SUMMARY

In contrast, the method according to the disclosure and the tank device according to the disclosure have the advantage that a structurally compact tank device is realized in a simple manner with simultaneous cost savings.

For the method according to the disclosure for actuating a tank device for storing a gaseous medium, at least two tank containers and a feed line which can be connected to the tank containers are provided, each tank container having at least one pressure-controlled control valve. Gaseous medium flows via the control valve from the tank device into the feed line in the direction of a load system. The method according to the invention has the following step:

Simultaneous opening of the control valves of the tank containers in a span of milliseconds during a supply to the load system, so that gaseous medium is conducted from the tank device via the feed line in the direction of the load system.

By opening the control valves almost simultaneously, i.e., in spans of milliseconds, the required maximum mass flow for the tank device can be realized without having to design the tank device, and in particular the cross-sections of the control valves, too large and too expensively. The associated solenoid assembly for actuating the control valves can also be designed in a compact way. In this way, a compact and cost-effective tank device can be realized.

In a first advantageous further development, it is provided that the span between the opening of the control valves comprises a range of 1 millisecond to 20 milliseconds. For example, the load caused by the current flow to a control unit of the tank device can be minimized.

In a further embodiment of the invention, it is advantageously provided that the tank device comprises a valve line which can be connected to the tank containers and in which valve line a central melting safety valve is arranged. The melting safety valve opens when a predetermined temperature threshold value is exceeded and thus conducts the gaseous medium from the tank containers via the valve line into an environment. This ensures that in the event of heat entering the tank device, e.g., a fire, the gaseous medium is conducted out of the tank containers and bursting is prevented.

In an advantageous further development, it is provided that a control valve is arranged between the respective tank containers and the valve line, by means of which control valve a fluidic connection between the tank containers and the valve line is controlled. In this way, the gaseous medium can flow out of the tank containers into the valve line or remain stored in the respective tank container by shutting off the control valve. The latter is particularly advantageous as a safety precaution, for example in the event of a break in the valve line.

The tank device according to the invention for storing a gaseous medium, in particular hydrogen, has at least two tank containers and a feed line which can be connected to the tank containers. Each tank container comprises at least one pressure-controlled control valve, which is arranged between the respective tank container and the feed line. The feed line is fluidically connected to a load system, the tank device having a control unit which is set up to carry out the method according to the invention described above. In this way, a tank device for storing a gaseous medium for various load systems can be realized in a structurally compact and cost-saving manner.

In an advantageous further development, it is provided that the control valve of the respective tank container is designed as a solenoid valve. This enables simple actuation.

In an advantageous further development, the tank containers are tubular. Advantageously, the tank containers comprise a carbon fiber-reinforced material. The geometry and suitable choice of tank containers means that they can be easily adapted to the gaseous medium and, for example, to a vehicle chassis.

Furthermore, according to the invention, a control unit is provided which is set up to carry out the method according to the invention.

The described tank device and the method actuating the tank device are preferably suitable in a fuel cell system for storing a gaseous medium, in particular hydrogen, for operating a fuel cell.

In advantageous embodiments, the tank device and the method according to the invention can be used in vehicles with a fuel cell drive.

In advantageous embodiments, the tank device and the method according to the invention can be used in vehicles with a hydrogen drive, for example in a vehicle with a hydrogen burner as drive.

BRIEF DESCRIPTION OF THE DRAWINGS

The drawing shows an exemplary embodiment of a tank device with a method for actuating the tank device according to the invention. The following are shown:

FIG. 1 a plan view of a possible exemplary embodiment of a tank device with a method according to the invention.

DETAILED DESCRIPTION

FIG. 1 shows a top view of an exemplary embodiment of a tank device 1 according to the invention. The tank device 1 has several tank containers 2, which are filled with a gaseous medium, for example hydrogen. The tank containers 2 are tubular in shape. The tank containers 2 also comprise a carbon fiber-reinforced material, for example.

Furthermore, each tank container 2 is connected at a first end to a feed line 3 via a branch 26, a control valve 5 being arranged in the branch 26 of the feed line 3. Thus, each tank container 2 has a control valve 5, via which the gaseous medium can be conducted from the tank container 2 in the direction of the feed line 3. The control valves 5 can be actuated by an electromagnet, for example.

A pressure regulating valve 8 is also arranged in the feed line 3, which is designed here as a solenoid valve. The pressure regulating valve 8 thus uses an electromagnet to control the hydrogen feed from the tank device 1 in the direction of a load system 40, for example a fuel cell system or a hydrogen combustion system. The pressure regulating valve 8 also regulates the pressure of the gaseous medium, in particular as a pressure reduction of the gaseous medium for its provision to the load system 40.

Furthermore, in an alternative arrangement, each tank container 2 is connected at a different end 24 to a valve line 6, with a further control valve 50 being arranged between each individual tank container 2 and the valve line 6. In the normal operating state, the other control valves 50 are also open, so that a connection between the inside of the tank container 2 and the valve line 6 is open. A central melting safety valve 10 is arranged in the valve line 6. The melting safety valve 10 is normally closed and only opens in the event of a fire or if a predetermined temperature threshold value of 105° C., for example, is exceeded, so that the hydrogen can be conducted from the tank containers 2 into an environment 30 via the valve line 6 and a possible explosion of the tank containers 2 due to excessive pressure is prevented.

The control valves 5, 50 are each arranged at the ends 22, 24 of the tank container 2, so that in the event of an accident of the tank device 1 or in the event of a rupture of the feed line 3 and/or the valve line 6, the control valves 5, 50 close and the gaseous medium cannot escape from the tank container 2.

Furthermore, the tank device 1 comprises a control unit 80, which is connected to the control valves 5, 50 and the melting safety valve 10. The control unit 80 also has an interface to a control unit of the load system 40, which is not shown.

If gaseous medium, for example hydrogen, is now to be supplied to the load system 40, all control valves 5 of the tank containers 2 are actuated and opened simultaneously in spans of milliseconds via the respective electromagnet of the respective control valve 5 by means of the control unit 80 and the gaseous medium is conducted from the tank device 1 via the feed line 3 in the direction of the load system 40. This means that the control valves 5 are opened one after the other in spans of 1 millisecond to 20 milliseconds. This makes it possible to realize small geometric dimensions of the control valve cross-sections despite maximum mass flow, for example. Furthermore, for example, a fuel cell system can be supplied with fuel, such as hydrogen, as a load system 40.

Furthermore, the tank device 1 and the aforementioned method are also suitable for a fuel cell-powered vehicle for providing the fuel, for example hydrogen, or in a hydrogen-powered vehicle for providing hydrogen.

The invention claimed is:

1. A method for actuating a tank device (1) for storing a gaseous medium, the tank device (1) comprising at least two tank containers (2) and a feed line (3) which can be connected to the tank containers (2), each tank container (2) has at least one pressure-controlled control valve (5), via which gaseous medium flows from the tank device (1) into the feed line (3) in a direction of a load system (40), wherein the method includes:

a. opening the control valves (5) of the tank containers (2) in a span of milliseconds while supplying the load system (40) such that the gaseous medium is conducted from the tank device (1) in the direction of the load system (40) via the feed line (3), wherein an interval of opening the control valves (5) comprises a span from 1 millisecond to 20 milliseconds.

2. The method according to claim 1, wherein the tank device (1) comprises a valve line (6) which can be connected to the tank containers (2) and in which valve line (6) a central melting safety valve (10) is arranged, which melting safety valve (10) opens when a predetermined temperature threshold value is exceeded and thus conducts the gaseous medium from the tank containers (2) via the valve line (6) into an environment (30).

3. The method according to claim 2, wherein a control valve (50) is arranged in each case between the respective tank containers (2) and the valve line (6), the control valve (50) controlling a fluidic connection between the tank containers (2) and the valve line (6).

4. A tank device (1) for storing the gaseous medium, the tank device (1) having the at least two tank containers (2) and the feed line (3) which can be connected to the tank containers (2), the tank containers (2) comprising the pressure-controlled control valves (5), which control valves (5) are arranged between the tank containers (2) and the feed lines (3) and wherein the feed lines (3) are fluidically connected to the load system (40), wherein the tank device (1) has a control unit (80) configured to carry out the method according to claim 1.

5. The tank device (1) according to claim 4, wherein the control valve (5) of the respective tank container (2) is a solenoid valve.

6. The tank device (1) according to claim 4, wherein the tank containers (2) are tubular.

7. The tank device (1) according to claim 4, wherein the tank containers (2) comprise a carbon-fiber-reinforced material.

8. The tank device (1) according to claim 4, wherein the gaseous medium is hydrogen.

9. A control unit (80) configured to perform the method according to claim 1.

10. A fuel cell system with a tank device (1) for storing a gaseous medium, wherein the tank device (1) is actuated by the method according to claim 1.

11. The fuel cell system according to claim 10, wherein the gaseous medium is hydrogen.

12. A fuel cell-powered vehicle with a tank device (1) for storing a gaseous medium, which tank device (1) is actuated by the method according to claim 1.

13. The fuel cell-powered vehicle according to claim 12, wherein the gaseous medium is hydrogen.

14. A hydrogen-powered vehicle with a tank device (1) for storing hydrogen, which tank device (1) is actuated by the method according to claim 1.

* * * * *